(12) United States Patent
Govindarajan et al.

(10) Patent No.: US 10,579,979 B2
(45) Date of Patent: Mar. 3, 2020

(54) DYNAMICALLY ADJUSTING VISUAL CODES DISPLAYED ON A DEVICE

(71) Applicant: PAYPAL, INC., San Jose, CA (US)

(72) Inventors: Satish Narayan Govindarajan, Los Altos, CA (US); Srikanth Nandiraju, Fremont, CA (US); Anantharaj Uruthiralingam, Santa Clara, CA (US); Carlos Manuel Rivas, Redwood City, CA (US); Gorantla Tejas Raj Vihar Reddy, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 126 days.

(21) Appl. No.: 15/710,637

(22) Filed: Sep. 20, 2017

(65) Prior Publication Data

US 2019/0087801 A1    Mar. 21, 2019

(51) Int. Cl.
| | |
|---|---|
| *G06Q 20/20* | (2012.01) |
| *G06Q 20/32* | (2012.01) |
| *G06Q 20/36* | (2012.01) |
| *G06Q 20/40* | (2012.01) |
| *G06Q 30/06* | (2012.01) |

(52) U.S. Cl.
CPC ....... *G06Q 20/204* (2013.01); *G06Q 20/3227* (2013.01); *G06Q 20/3276* (2013.01); *G06Q 20/3674* (2013.01); *G06Q 20/401* (2013.01); *G06Q 30/06* (2013.01)

(58) Field of Classification Search
None
See application file for complete search history.

(56) References Cited

U.S. PATENT DOCUMENTS

| | | | | |
|---|---|---|---|---|
| 2003/0150911 A1* | 8/2003 | Joseph | ................... | G06K 17/00 235/382 |
| 2010/0279610 A1* | 11/2010 | Bjorhn | ................... | G06Q 20/20 455/41.2 |
| 2012/0209749 A1* | 8/2012 | Hammad | ............... | G06Q 30/06 705/27.1 |
| 2013/0073365 A1* | 3/2013 | McCarthy | .............. | G06Q 20/02 705/14.23 |
| 2014/0006184 A1* | 1/2014 | Godsey | ................... | G06Q 20/08 705/16 |
| 2014/0081783 A1* | 3/2014 | Paranjape | .............. | G06Q 20/20 705/21 |

(Continued)

FOREIGN PATENT DOCUMENTS

WO    WO-2017103701 A1 *  6/2017 ............. G06Q 40/00

*Primary Examiner* — Suezu Ellis
(74) *Attorney, Agent, or Firm* — Haynes and Boone LLP

(57) ABSTRACT

A system is configured to perform operations that include causing a merchant device to display a first visual code. The operations further include receiving a request to initiate a payment transaction between a consumer and a merchant, the request to initiate the payment transaction being transmitted to the system in response to a consumer device of the consumer scanning the first visual code displayed by the merchant device. The operations also include causing funds to be transferred from an account of the consumer to an account of the merchant. Further, the operations include in response to determining, based on one or more criteria, an occurrence of a code change event, causing the merchant device to display a second visual code in replacement of the first visual code.

20 Claims, 5 Drawing Sheets

(56) References Cited

U.S. PATENT DOCUMENTS

| | | | | |
|---|---|---|---|---|
| 2014/0281522 A1* | 9/2014 | Bortnem | ............... | H04W 12/06 |
| | | | | 713/168 |
| 2016/0048830 A1* | 2/2016 | Laracey | ............... | G06Q 20/108 |
| | | | | 705/67 |
| 2017/0243262 A1* | 8/2017 | Pan | ........................ | G07B 15/02 |
| 2018/0018666 A1* | 1/2018 | Solanki | ................ | G06Q 10/107 |
| 2019/0087815 A1* | 3/2019 | Goldschmidt | ..... | G06Q 20/3674 |

* cited by examiner

DYNAMICALLY ADJUSTING VISUAL CODES DISPLAYED ON A DEVICE

BACKGROUND

In-store electronic payments are becoming more and more popular to facilitate efficient and quick payment transactions. In certain instances, however, the equipment and devices that are used to effect in-store electronic payments can be expensive to obtain, operate, and/or maintain.

Figure 1:
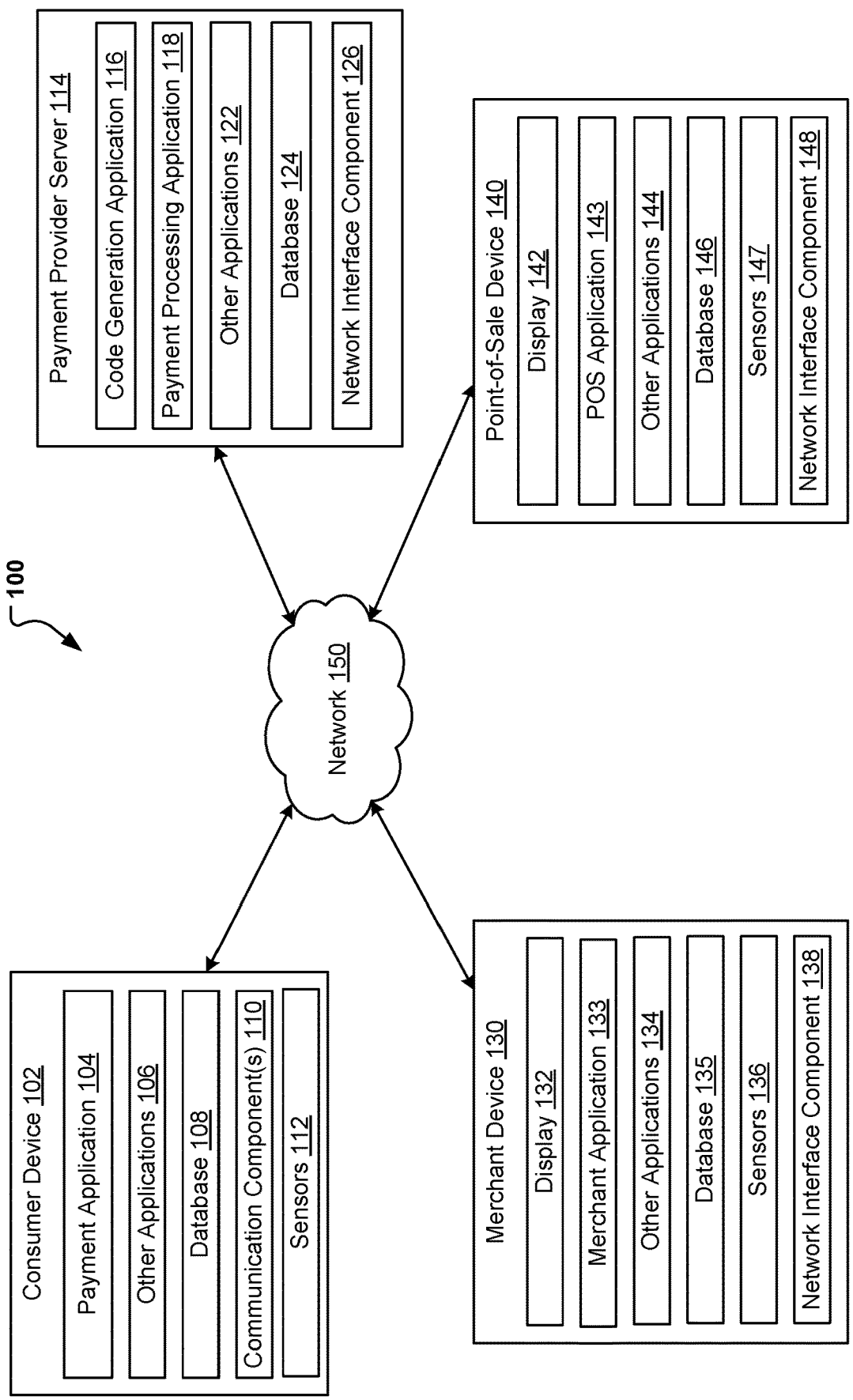
FIG. 1 is a block diagram of a networked system suitable for implementing the processes described herein for dynamically adjusting visual codes displayed on a device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for dynamically adjusting visual codes displayed on a device. According to certain embodiments, a merchant device of a merchant may reside at a location of corresponding to a store or other establishment of the merchant. The merchant device may establish a network connection with a payment provider server. As part of establishing the network connection, the merchant device may transmit and/or otherwise provide a device identifier associated with the merchant device to the payment provider server. In some implementations, the merchant device may establish the network connection with the payment provider server in response to the merchant device successfully authenticating an authorized user of the merchant device. For instance, the merchant device may include one or more biometric sensors (e.g., a fingerprint scanner, eye scanner, camera, and/or other biometric sensor) to receive biometric input from one or more authorized users.

Based on the device identifier, the payment provider server may generate a visual code and transmit instructions to the merchant device that cause the merchant device to display the visual code. For example, the visual code may correspond to a Quick Response (QR) code although it will be appreciated that other types of visual codes are also contemplated within the present disclosure. The visual code may encode payment initiation instructions for initiating a payment transaction with the merchant, such as to pay for an item (e.g., a good or service) offered by the merchant. As discussed in more detail below, the payment provide system may be configured to cause the merchant device to change the display of the visual code based on one or more code change criteria.

In certain implementations, a consumer device of a consumer may decode the visual code displayed by the merchant device, such as by optically scanning or reading the visual code (e.g., via a camera and/or image processor). Decoding the visual code enables the consumer device to access and/or read the payment initiation instructions that was encoded in the visual code. The payment initiation instructions may cause the consumer device to transmit a payment request to the payment provider. For instance, the payment initiation instructions may include a Uniform Resource Locator (URL) address, and the consumer device may automatically access the URL address in response to decoding the visual code. The URL address may correspond to a website hosted by and/or otherwise associated with the payment provider. The consumer device may interact with the website and provide various inputs (e.g., entering a payment amount), and based on provide inputs, the payment provider server may be configured to process the payment transaction between the consumer and the merchant.

In other embodiments, the consumer device may decode the visual code using a payment application provided by the payment provider. In response to decoding the visual code, the payment initiation instructions included in the visual code may cause the consumer device to display a user interface within the payment application. The user interface may provide a way for the consumer to input a payment amount that the consumer wishes to pay the merchant (e.g., the price of the items being purchased from the merchant). After the payment amount has been entered, the consumer device may transmit the payment amount to the payment provider server, which may be configured to process the payment transaction by transferring funds equal to the payment amount from an account of the consumer to an account of the merchant.

Further, according to one or more embodiments, subsequent to causing the merchant device to display the visual code, the payment provider server may evaluate one or more code change criteria. In some cases, based on the one or more code change criteria being satisfied, the payment provider server may generate a second visual code and cause the merchant device to display the second visual code in replacement of the previous visual code displayed by the merchant device. The one or more code change criteria may include, but is not limited to, an amount of elapsed time, a predetermined number of payment transactions processed for the merchant by the payment provider.

The second visual code may be a different image having a different visual appearance than the previous visual code. In certain implementations, the second visual code may encode the same payment initiation instructions that were encoded by the previous visual code. In other implementations, the second visual code may encode different payment initiation instructions to initiate payment with the merchant using the payment provider. Thus, visual codes displayed by the merchant device may be dynamically changed by the payment provider server. The ability to dynamically changed the visual code displayed by the merchant device may prevent certain types of fraud. For example, if a static visual code were used for each merchant in a set of merchants, a first merchant may be able to place its respective static visual code at a store location of a second merchant and potentially receive payments and purchases meant for the second merchant.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a consumer device 102 configured to interface with a consumer, a payment provider server 114, a merchant device 130, and a point-of-sale (POS) device 140, which may be in communication with each other over a network 150. The consumer device 102, the payment provider server 114, the merchant device 130, and the POS device 140 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The consumer device 102 may be implemented as a communication device that may utilize appropriate hardware and software configured for wired and/or wireless communication with the payment provider server 114, the merchant device 130, and/or the POS device 140.

The consumer device 102 may include a payment application 104, other applications 106, a database 108, communication components 110, and sensors 112. The payment application 104 and other applications 106 may correspond to executable processes, procedures, and/or applications with associated hardware. In other embodiments, consumer device 102 may include additional or different components having specialized hardware and/or software to perform operations associated with the digital wallet applications 104 and/or the other applications 106.

The payment application 104 may be provided and maintained by a payment provider associated with the payment provider server 114. In certain embodiments, the payment application 104 may provide an interface for the user to access a merchant digital wallet account that the user maintains with the merchant. The payment application 104 may be configured to decode one or more visual codes that may be displayed by the merchant device 130. For instance, the payment application 104 may be configured to access a camera included in the consumer device 102 (e.g., included in the sensors 112) to scan, read, and/or otherwise capture an image of a visual code displayed by the merchant device 130. The payment application 104 may decode the visual code based on the captured image. As described in more detail below, in response to decoding the visual image, the payment application 104 may be automatically configured to transmit a payment request to the payment provider server 114 to initiate payment transaction with the merchant.

The consumer device 102 may execute the other applications 106 to perform various other tasks and/or operations corresponding to the consumer device 102. For example, the other applications 106 may include security applications for implementing client-side security features, programmatic client applications for interfacing with appropriate application programming interfaces (APIs) over network 150 and/or payment network 160, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the consumer device 102. The other applications may 106 include social networking applications. Additionally, the other applications 106 may include device interfaces and other display modules that may receive input and/or output information. For example, the other applications 106 may include a graphical (GUI) configured to provide an interface to the user.

The consumer device 102 may further include a database 108, which may be stored in a memory and/or other storage device of the consumer device 102. The database 108 may include, for example, identifiers (IDs) such as operating system registry entries, cookies associated with the payment application 104 and/or other applications 106, IDs associated with hardware of the communication component 110, IDs used for payment/user/device authentication or identification, and/or other appropriate IDs. According to a particular embodiment, the database 108 may also store a merchant identifier associated with the merchant, a location identifier associated with the merchant location, and/or a POS identifier associated with the consumer device 102. The database 108 may also include information corresponding to one or purchase transactions of customers who have purchased goods or services from the merchant, browsing histories of the customers, or other types of customer information. In certain embodiments, the consumer device 102 may also include information corresponding to payment tokens, such as payment tokens generated by the payment provider server 114. Further, the database 108 may store login credentials, contact information, biometric information, and/or authentication information.

The consumer device 102 may also include at least one communication component 110 configured to communicate with various other devices such as the merchant device 130, POS device 140, and/or the payment provider server 114. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The consumer device 102 may also include one or more hardware sensors 112 to determine user inputs from the consumer, motion of the consumer device 102, biometric information associated with the consumer or authorized users of the consumer device 102, and/or various environmental data associated with the consumer device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The merchant device 130 may be maintained, for example, by a merchant and may be in communication with the payment provider server 114, which may provide payment processing services for the merchant. However, in other embodiments, the merchant device 130 may be maintained by or include a financial service provider, social networking service, email or messaging service, media sharing service, and/or other service provider.

The merchant device 130 includes a display 132 and a merchant application 133. The display 132 may be an electronic-ink (E-ink) display although other types of displays are also possible including liquid crystal displays (LCDs), light emitting diode (LED) displays, and/or the like. Further, the display 132 may display the one or more visual codes as previously discussed with respect to the consumer device 102. According to certain embodiments, the display 132 may display the one or more visual codes in response to the merchant application 133 authenticating the merchant and/or an authorized user of the merchant device 130.

For instance, the merchant application 133 may receive one or more biometric inputs (e.g., a fingerprint, facial image, and/or the like) via the sensors 136. The merchant application 133 may further determine whether the one or more biometric inputs matches stored biometric information corresponding to an authorized user of the merchant device 130. In response to determining a match between the one or more biometric inputs and the stored biometric information, the merchant application 133 may transmit a request, to the payment provider server 114, for a visual code to display. The request may include a device identifier associated with merchant device 130, and the payment provider server 114 may transmit, in response to the request, a generated visual code that the merchant application 133 may be configured to provide to the display 132.

The merchant device 130 may execute the other applications 134 to perform various other tasks and/or operations corresponding to the payment provider server and/or the consumer device 102. For example, the other applications 134 may include security applications for implementing server-side security features, programmatic client applications for interfacing with appropriate application programming interfaces (APIs) over network 150, or other types of applications. The other applications 134 may also include additional communication applications, such as email, texting, voice, and instant messaging (IM) applications that enable a user to send and receive emails, calls, texts, and other notifications through the network 150. In various embodiments, the other applications 134 may include location detection applications, such as a mapping, compass, and/or global positioning system (GPS) applications, which may be used to determine a location of the consumer device 102. The other applications may 134 include social networking applications. Additionally, the other applications 134 may include device interfaces and other display modules that may receive input and/or output information. For example, the other applications 144 may include a GUI configured to provide an interface to the user.

The merchant device 130 may further include a database 135, which may be stored in a memory and/or other storage device of the merchant device 130. The database 135 may include, for example, IDs such as operating system registry entries, cookies associated with the merchant application 133, biometric information, IDs associated with hardware of the network interface component 148, IDs used for payment/user/device authentication or identification, and/or other appropriate IDs. According to a particular embodiment, the database 135 may also store a merchant identifier associated with the merchant, a location identifier associated with the merchant location, and/or a POS identifier associated with the consumer device 102.

In various embodiments, the merchant device 130 also includes at least one network interface component 138 that is configured to communicate with the consumer device 102 and/or the payment provider server 114 via the network 150. For example, according to a particular embodiment, the merchant device 130 may receive voice communication information from the consumer device 102 via the network interface component 148. The network interface component 138 may comprise a DSL modem, an Ethernet device, a broadband device, a satellite device and/or various other types of wired and/or wireless network communication devices including microwave, RF, and IR communication devices.

The payment provider server 114 may be maintained, for example, by the payment provider, which may provide payment processing services for the merchant. In one example, the payment provider server 114 may be provided by PAYPAL, Inc. of San Jose, consumer digital wallet account, USA. However, in other embodiments, the payment provider server 114 may be maintained by or include a financial service provider, social networking service, email or messaging service, media sharing service, and/or other service provider, which may provide payment processing services.

The payment provider server 114 includes a code generation application 116 that may be configured to generate visual codes, such as QR codes, and cause the merchant device 130 to display the generated visual codes. For instance, as previously mentioned, the code generation application 116 may receive a device identifier associated with the merchant device 130. Further, the code generation application 116 may generate a first visual code to include payment initiation instructions, that in response to being scanned by the consumer device 102, causes the consumer device 102 to transmit a payment request to the payment provider server 114 to process a payment transaction between the consumer and the merchant. The payment request may include the device identifier of the merchant device 130 and a consumer identifier associated with the consumer and/or consumer device 102.

A payment processing application 118 may be configured to process the payment request. For instance, the payment processing application 118 may transmit a request to the consumer device 102 (e.g., the payment application 104) to enter a payment amount for the payment request. Upon receive an inputted payment amount, the payment application 104 may transmit the inputted payment amount back to the payment provider server 114. The payment processing application 118 may transfer funds equal to the payment amount from an account of the consumer to an account of the merchant. In certain implementations, the payment processing application 118 may also cause the merchant device 130 and/or the POS device 140 to display the payment amount and an indication that the payment transaction is complete. By displaying the payment amount via the merchant device 130 and/or the POS device 140, the merchant and/or consumer may verify that the payment amount is correct for the items being purchased.

According to one or more embodiments, the code generation application 116 may also be configured to generate a second visual code based on one or more code change criteria being satisfied. The one or more code change criteria may include, but is not limited to, an amount of elapsed time, a predetermined number of payment transactions processed for the merchant by the payment provider. Further, in response to the one or more code change criteria being satisfied, the code generation application 116 may cause the merchant device 130 to display the second visual code in replacement of the first visual code. Thus, in the manner, the code generation application 116 may periodically cause the merchant device 130 to display different visual codes depending on the one or more code change criteria being satisfied. In certain embodiments, upon causing the merchant device 130 to change the display of a visual code to another visual code, the code generation application 116 may reset the code change criteria (e.g., resetting a counter corresponding to the amount of elapsed time to 0, and then starting the counter and/or resetting a counter corresponding to a number of payment transactions that have been processed by to 0).

The payment provider server 114 may execute the other applications 122 to perform various other tasks and/or operations corresponding to the payment provider server and/or the consumer device 102. For example, the other applications 122 may include security applications for implementing server-side security features, programmatic client applications for interfacing with appropriate application programming interfaces (APIs) over network 150, or other types of applications. The other applications 122 may also include additional communication applications, such as email, texting, voice, and instant messaging (IM) applications that enable a user to send and receive emails, calls, texts, and other notifications through the network 150. In various embodiments, the other applications 122 may include location detection applications, such as a mapping, compass, and/or global positioning system (GPS) applications, which may be used to determine a location of the consumer device 102. The other applications may 122 include social networking applications. Additionally, the other applications 122 may include device interfaces and other display modules that may receive input and/or output information. For example, the other applications 122 may include a GUI configured to provide an interface to the user.

The payment provider server 114 may further include a database 124, which may be stored in a memory and/or other storage device of the payment provider server 114. The database 124 may include, for example, IDs such as operating system registry entries, cookies associated with the payment processing application 118, biometric information, IDs associated with hardware of the network interface component 126, IDs used for payment/user/device authentication or identification, and/or other appropriate IDs. According to a particular embodiment, the database 108 may also store a merchant identifier associated with the merchant, a location identifier associated with the merchant location, and/or a POS identifier associated with the consumer device 102.

In various embodiments, the payment provider server 114 also includes at least one network interface component 126 that is configured to communicate with the consumer device 102, POS device 140, and/or merchant device 130 via the network 150 and/or the payment network 160. The network interface component 126 may comprise a DSL modem, an Ethernet device, a broadband device, a satellite device and/or various other types of wired and/or wireless network communication devices including microwave, RF, and IR communication devices.

The POS device 140 may be maintained, for example, by a merchant and may be in communication with the payment provider, which may provide payment processing services for the merchant. The POS device 140 includes a display 142 and a POS application 143. According to a particular embodiment, one or more items sold by the merchant may be scanned in by the POS device 140, such as via the sensors 147. For example, the sensors 147 may include a barcode reader, and each of the one or more items may have an attached barcode. The barcode reader may decode, by scanning the barcodes, respective item identifiers corresponding to each of the one or more items. The barcode reader may provide the item identifiers to the POS application 143. The POS application 143 may determine, based on the item identifiers, respective item information corresponding to each of the one or more items and cause the display 142 to display the item information. The item information for a particular item may include a description of the item, a price of the item, quantity, and/or types of information related to the item. Further, the POS application 143 may cause the display 142 to display a total price equal to the sum of the respective prices of the items.

The POS device 140 may execute the other applications 144 to perform various other tasks and/or operations corresponding to the payment provider server and/or the consumer device 102. For example, the other applications 144 may include security applications for implementing server-side security features, programmatic client applications for interfacing with appropriate application programming interfaces (APIs) over network 150, or other types of applications. The other applications 134 may also include additional communication applications, such as email, texting, voice, and instant messaging (IM) applications that enable a user to send and receive emails, calls, texts, and other notifications through the network 150. In various embodiments, the other applications 144 may include location detection applications, such as a mapping, compass, and/or global positioning system (GPS) applications, which may be used to determine a location of the consumer device 102. The other applications may 144 include social networking applications. Additionally, the other applications 144 may include device interfaces and other display modules that may receive input and/or output information. For example, the other applications 134 may include a GUI configured to provide an interface to the user.

The POS device 140 may further include a database 146, which may be stored in a memory and/or other storage device of the POS device 140. The database 146 may include, for example, IDs such as operating system registry entries, cookies associated with the POS application 143, biometric information, IDs associated with hardware of the network interface component 148, IDs used for payment/user/device authentication or identification, and/or other appropriate IDs. According to a particular embodiment, the database 146 may also store a merchant identifier associated with the merchant, a location identifier associated with the merchant location, and/or a POS identifier associated with the consumer device 102.

In various embodiments, the POS device 140 also includes at least one network interface component 148 that is configured to communicate with the payment provider server 114 via the network 150. For example, according to a particular embodiment, the POS device 140 may receive voice communication information from the consumer device 102 via the network interface component 138. The network interface component 148 may comprise a DSL modem, a payment provider server 114TN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
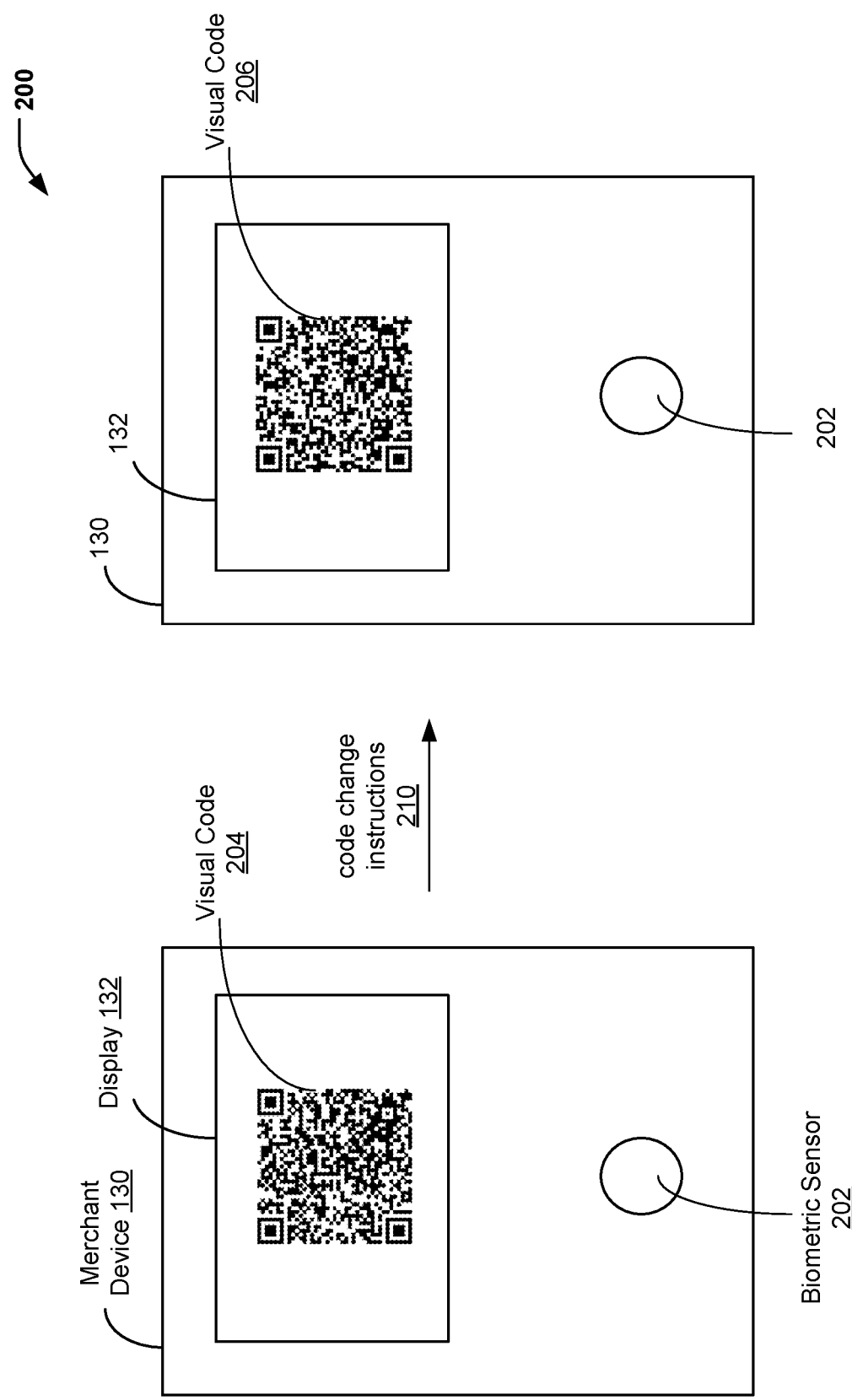
FIG. 2 is an is an example diagram of a merchant device that visual codes that can be dynamically adjusted, according to an embodiment.

FIG. 2 illustrates a diagram of the merchant device 130 changing the visual code being displayed. The merchant device 130 may include the display 132 and a biometric sensor 202. Before receiving code change instructions 210, such as from the code generation application 116 of the payment provider server 114, the merchant device 130 may display visual code 204 via the display 132. As previously mentioned, the visual code 204 may be displayed in response to an authorized user of the merchant device 130 being authenticated via the biometric sensor.

According to a particular embodiment, the visual code 204 may encode first payment initiation instructions. To this end, if a consumer wishes to pay the merchant of the merchant device 130, the consumer may decode the visual code 204 via the consumer device 102, which may cause the consumer device 102 to transmit a payment request to the payment provider server 114 according to the first payment instructions. For instance, decoding the first payment initiation instructions may cause the consumer device 102 display a first user interface within the payment application 104. The first user interface may include a field in which a payment amount to transfer to the merchant may be entered. Upon receiving an inputted payment amount via the first user interface, the consumer device 102 may transmit a payment request that includes the payment amount and a merchant identifier associated with the merchant to the payment provider server 114.

In another particular embodiment, the first payment initiation instructions may include a first URL address, and the consumer device 102 may be configured to navigate to the first URL address upon decoding the visual code 204. The first URL address may be hosted by the payment provider server 114 or another server associated with the payment provider. Additionally, navigating to the first URL address may cause the consumer device 102 to display a first web interface in which the payment amount to transfer to the merchant may be entered. Upon receiving an inputted payment amount via the first web interface, the consumer device 102 may transmit a payment request that includes the payment amount and a merchant identifier associated with the merchant to the payment provider server 114.

Further, the merchant device 130 may receive the code change instructions 210, which may cause the merchant device 130 to display visual code 206 in replacement of visual code 204. Visual code 206 may have a different visual appearance than visual code 204, and visual code 206 may encode second payment initiation instructions. In certain implementations, the first payment initiation instructions may be the same as the second payment initiation instructions, although it will be appreciated that they can be different in other implementations.

For example, upon decoding the visual code 206, the consumer device 102 may be configured to display a second user interface within the payment application 104 that may be the same as the first user interface. In other embodiments, however, the second user interface may be different than the first user interface. As another example, the second payment initiation instructions encoded in visual code 206 may include a second URL address, which may be the same as the first URL address. In other embodiments, however, the second URL address may be different than the first URL address.

Figure 3:
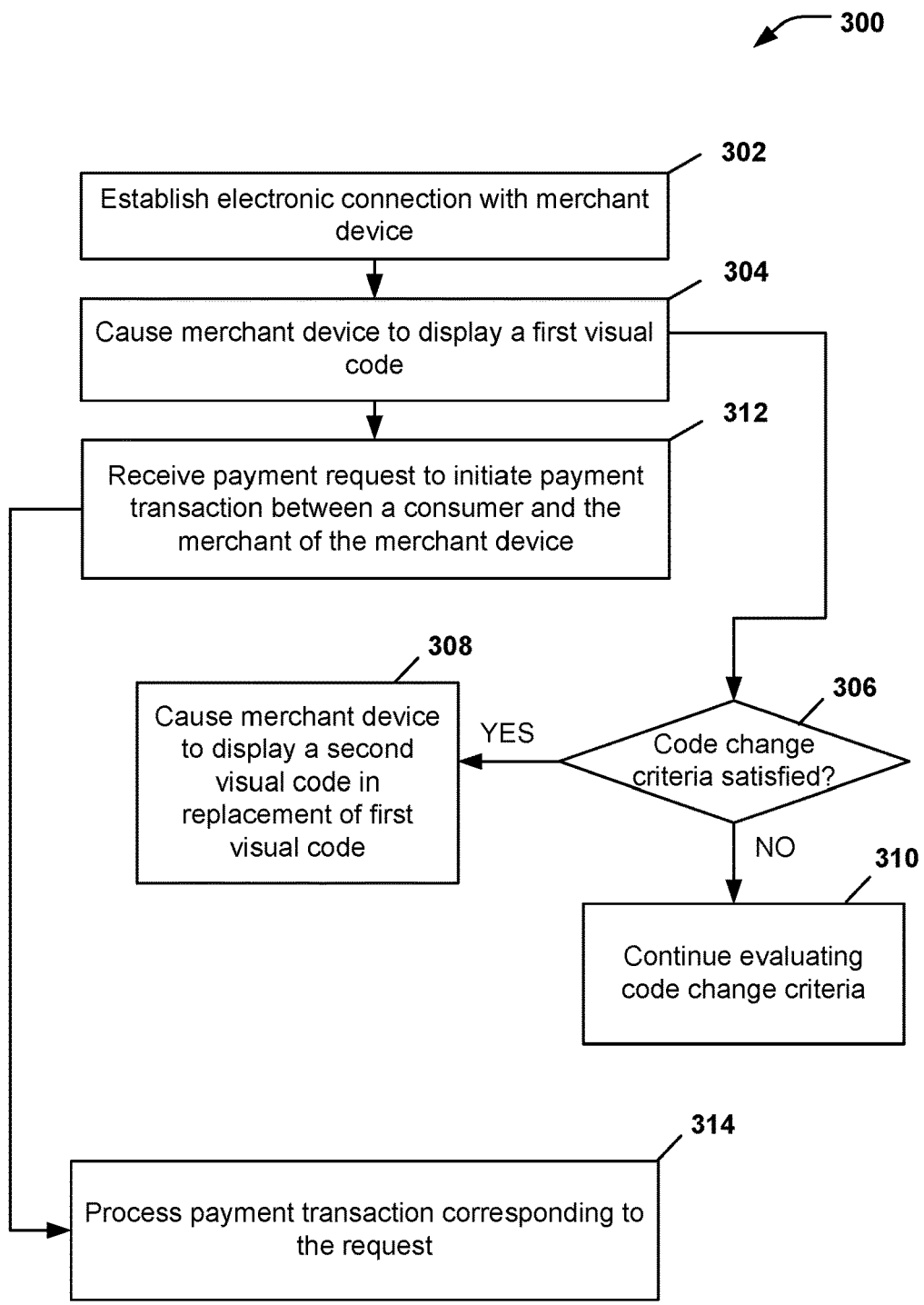
FIG. 3 is an example flow diagram for dynamically adjusting visual codes displayed on a device, according to another embodiment.
Figure 4:
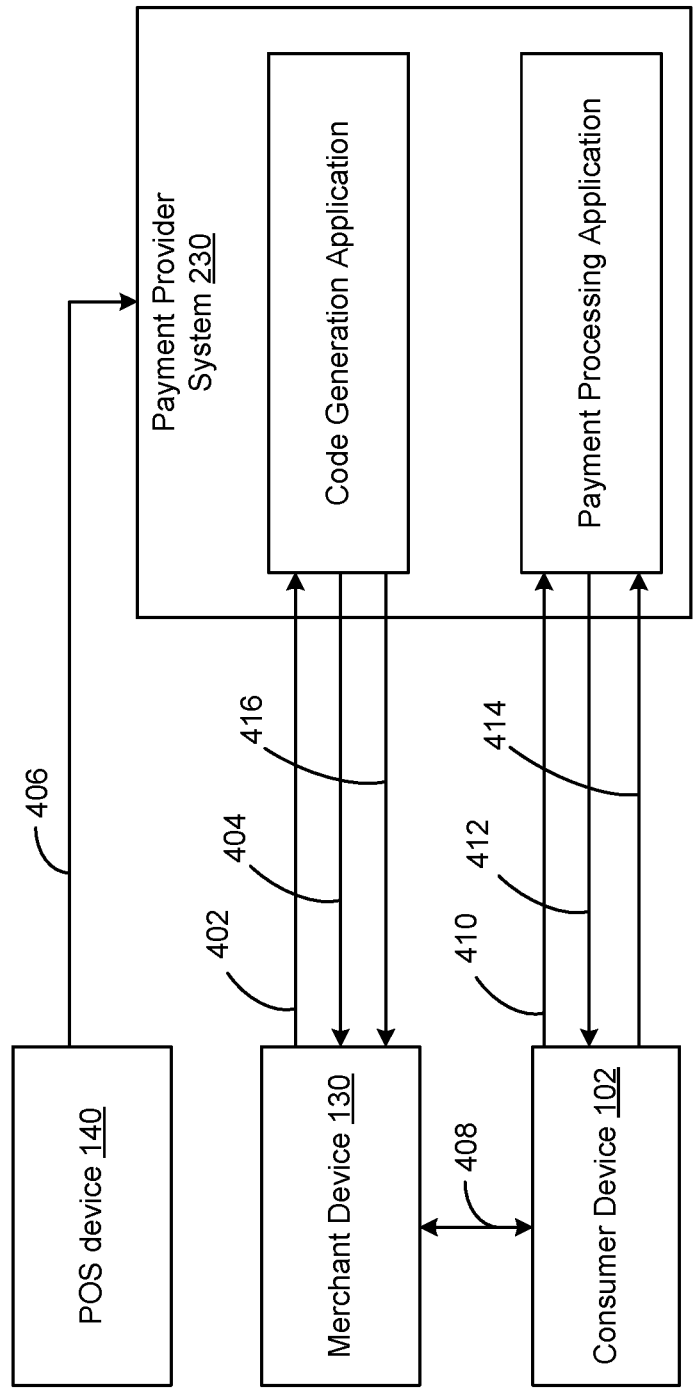
FIG. 4 is an is an example data flow diagram for dynamically adjusting visual codes displayed on a device, according to an embodiment.

FIG. 3 illustrates a flow diagram of a method 300 for dynamically adjusting visual codes displayed on merchant device. FIG. 4 illustrates a diagram of a data flow 400 for dynamically adjusting visual codes displayed on merchant device. FIG. 3 will be described in conjunction with references to elements illustrated in FIG. 4. Note that one or more steps, processes, and methods described herein may be omitted, performed in a different sequence, or combined as desired or appropriate. As previously discussed, the consumer digital wallet account may be provided to the user by the payment provider, and the merchant digital wallet account may be provided to the user by the merchant for use when the user purchases an item or other product from the merchant.

At step 302, the payment provider server 114 may establish an electronic connection with the merchant device 130. For example, the merchant device 130 may transmit a code request 402 to the code generation application 116 in response to an authorized user of the merchant device 130 being authenticated. As previously discussed, the authorized user may be authenticated by comparing biometric information input by the authorized user with stored biometric information accessible by the merchant device 130. In some implementations, the code request 402 may include a device identifier associated with the merchant device 130.

At step 304, the payment provider server 114 may cause the merchant device 130 to display a first visual code, such as the visual code 204 illustrated in FIG. 2. For instance, based on the code request 402, the code generation application 116 may generate the first visual code and transmit 404 instructions to the merchant device 130 that cause the merchant device 130 to display the first visual code. Steps 306-310 may be performed at any point after causing the merchant device 130 to display the first visual code as described above with respect to step 304. As such, any of steps 306-310 may be performed prior to, in parallel to, or subsequent to any of steps 312 and 314.

At step 306, the payment provider server 114 may determine whether one or more code change criteria has been satisfied. If so, the method 300 may proceed to step 308, where the payment provider server 114 may cause the merchant device to display a second visual code in replacement of the first visual code. For example, the code generation application 116 may determine that the one or more code change criteria has been satisfied, and in response, the code generation application 116 may transmit 416 instructions to the merchant device 130 that cause the merchant device 130 to display the second visual code, such as visual code 206 illustrated in FIG. 2. As previously discussed, the second visual code may be different than the first visual code such as having a different visual appearance than the first visual code and/or storing different payment initiation instructions than the first visual code.

If the one or more code change criteria has not been satisfied, the method 300 may proceed to step 310, in which the payment provider server 114 (e.g., the code generation application 116) may continue monitoring and/or evaluating the code change criteria.

At step 312, the payment provider server 114 may receive a request to initiate a payment transaction between a consumer and the merchant (of the merchant device 130). For example, the consumer device 102 may scan and/or decode the first visual code displayed by the merchant device 130. As previously discussed, the first visual code may include payment initiation instructions that cause the consumer device 102 to transmit a payment request 410 to the payment processing application 118. The payment request may include a consumer identifier corresponding to the merchant and the device identifier corresponding to the merchant device 130. The consumer device 102 may be configured to determine the merchant identifier based on information encoded in the first visual code, such as the payment initiation instructions.

At step 314, the payment provider server 114 may process the payment transaction corresponding to the payment request. For example, the payment processing application 118, in response to the payment request 412, may transmit a subsequent request to the consumer device for a payment amount to be entered. In response, the consumer device 102 may transmit an entered payment amount 414 back to the payment processing application 118, which may cause a transfer of funds equal to the entered payment amount from an account of the consumer to an account of the merchant.

As previously discussed, scanning the visual code displayed by the merchant device 130 may cause the consumer device 102 to display a user interface within the payment application 104. The user interface may include a field for which the consumer can enter a payment amount for a payment transaction with the merchant. In a particular embodiment the entered payment amount by the consumer may be included in the payment request 410. As a result, in this particular embodiment, the data flow corresponding to arrows 412 and 414 may be omitted.

According to a particular embodiment, the payment provider server 114 may be aware of one or more items being purchased by the consumer from the merchant. For example, prior to the consumer device decoding the first visual code displayed by the merchant device 130, the POS device 140 may transmit 406, to the payment provider server 114, one or more item identifiers corresponding to the one or more items. As previously discussed, the POS device 140 may, in certain cases, determine the one or more identifiers based on barcodes attached to the one or items being scanned by a barcode reader associated with the POS device 140.

The payment provider server 114 may also be configured to determine, after receiving the one or more item identifiers, that next payment request corresponding to a visual code displayed by the merchant device 130 is to be applied and/or otherwise associated with the one or more item identifiers.

Figure 5:
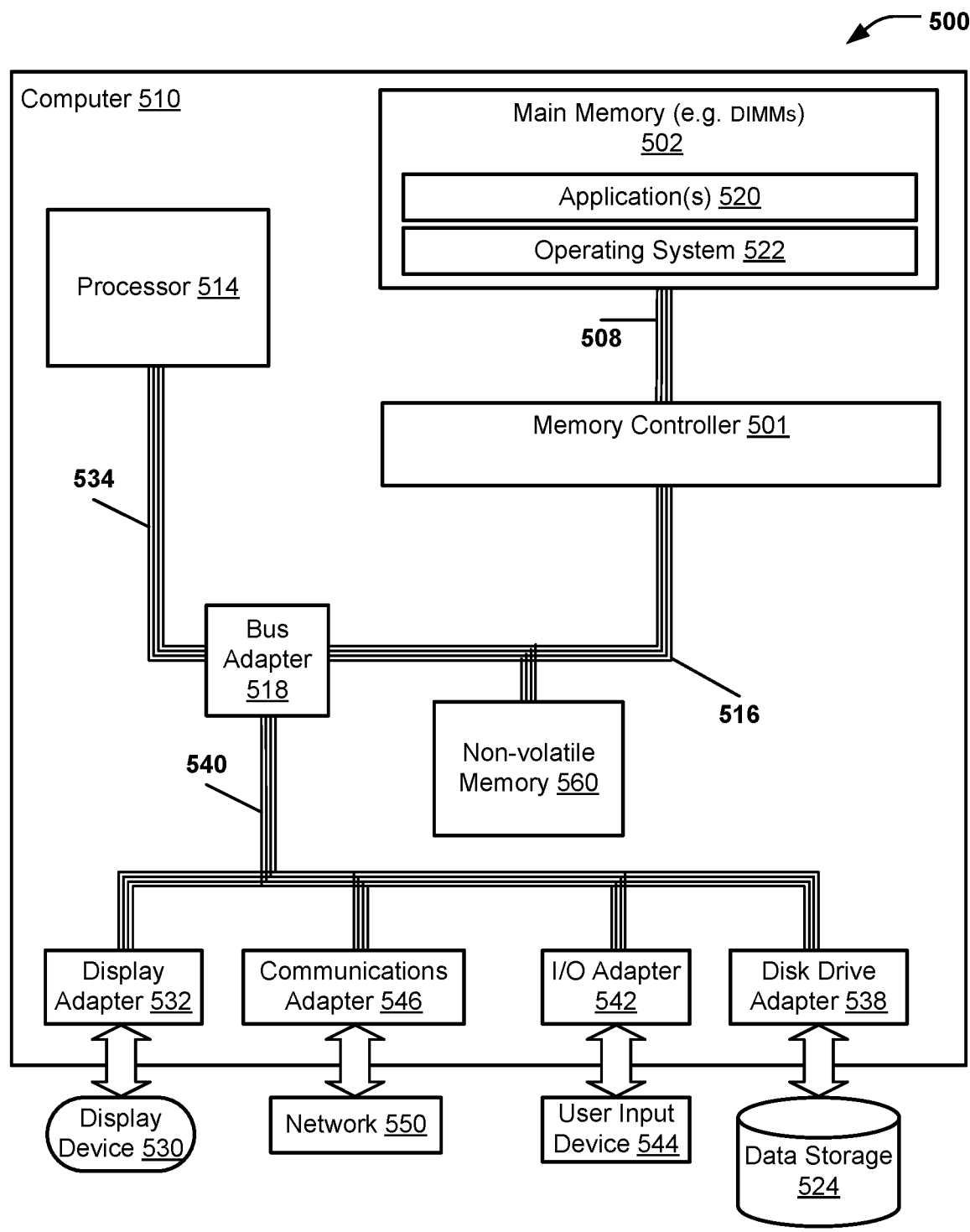
FIG. 5 is a block diagram of a computer system suitable for implementing one or more components in FIG. 1-4, according to an embodiment.

FIG. 5 is a block diagram of a computer system 500 suitable for implementing one or more components in FIG. 1, according to an embodiment. Referring to FIG. 5, an illustrative system 500 including a computer 510 is shown. The computer 510 may be an implementation of a computing system that includes or corresponds to the consumer device 102, the payment provider server 114, merchant device 130, and/or POS device 140 of FIG. 1. The computer 510 includes at least one computer processor (CPU) 514 (e.g., a hardware processor) as well as main memory 502, a memory controller 501, and a non-volatile memory 560. The main memory 502 is connected through a memory bus 508 to the memory controller 501. The memory controller 501 and the non-volatile memory 560 are connected through a second memory bus 516 and a bus adapter 518 to the processor 514 through a processor bus 534.

Stored at the memory 502 are one or more applications 520 that may be module(s) or computer program instructions for carrying out particular tasks (e.g., the payment application 104, web browsers, code generation application 116, merchant application 133, POS application 143, and payment processing applications 118 of FIG. 1). Also stored at the main memory 502 is an operating system 522. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 522 and the application 520 in the example of FIG. 5 are shown in the main memory 502, but components of the aforementioned software may also, or in addition, be stored at non-volatile memory (e.g., on data storage, such as data storage 524 and/or the non-volatile memory 560).

The computer 510 includes a disk drive adapter 538 coupled through an expansion bus 540 and the bus adapter 518 to the processor 514 and other components of the computer 510. The disk drive adapter 538 connects non-volatile data storage to the computer 510 in the form of the data storage 524 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 524 may store the data and information described herein.

The computer 510 also includes one or more input/output ("I/O") adapters 542 that implement user-oriented input/output through, for example, software drivers and computer hardware for controlling input and output to and from user input devices 544, such as keyboards and mice. In addition, the computer 510 includes a communications adapter 546 for data communications with a data communications network 560. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 546 implements the hardware level of data communications through which one computer sends data communications to another computer, directly or through a data communications network. Examples of the communications adapter 546 suitable to use in the computer 510 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 510 also includes a display adapter 532 that facilitates data communication between the bus adapter 518 and a display device 530, enabling the application 520 to visually present output on the display device 530.

In various embodiments of the present disclosure, execution of instruction sequences to practice the present disclosure may be performed by computer system 500. In various other embodiments of the present disclosure, a plurality of computer systems 500 coupled by communications adapter 546 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (consumer device 102-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A system, comprising:
one or more hardware processors; and
a memory storing computer-executable instructions, that in response to execution by the one or more hardware processors, causes the system to perform operations comprising:
receiving a request to connect with a merchant device of a merchant, the request including a device identifier corresponding to the merchant device;
subsequent to establishing an electronic connection with the merchant device based on the request, causing the merchant device to display a first visual code based on the device identifier included in the request;
receiving an item identifier corresponding to a good or a service offered by the merchant, wherein the item identifier is received from a point-of-sale device that is different than the merchant device;
after receiving the item identifier, receiving a request to initiate a payment transaction between a consumer and the merchant, the request to initiate the payment transaction being transmitted to the system in response to a consumer device of the consumer scanning the first visual code displayed by the merchant device;
associating the item identifier with the request to initiate the payment transaction;
causing the consumer device to generate a user interface displaying a request for a payment amount to entered;
subsequent to receiving an entered payment amount corresponding to the displayed request on the user interface, causing funds equal to the entered payment amount to be transferred from an account of the consumer to an account of the merchant; and
in response to determining, based on one or more criteria, an occurrence of a code change event, causing the merchant device to display a second visual code in replacement of the first visual code, the second visual code being different than the first visual code.

2. The system of claim 1, wherein the one or more criteria comprises at least one of a predetermined amount of elapsed time, a number of completed payment transactions, or a number of initiated payment transactions.

3. The system of claim 1, wherein the operations further comprise:
causing a representation of the good or the service corresponding to the item identifier to be displayed on the user interface.

4. The system of claim 1, wherein the first visual code comprises a Quick Response (QR) code.

5. The system of claim 1, wherein the operations further comprise:
authenticating the merchant device based on biometric information corresponding to an authorized user of the merchant device, wherein the causing the merchant device to display the first visual code is performed in response to the authenticating the merchant device.

6. The system of claim 5, wherein the biometric information comprises at least one of a fingerprint or a facial image, and the authenticating the merchant device based on the biometric information comprises determining whether the biometric information of the user matches stored biometric information.

7. The system of claim 1, wherein the operations further comprise:
in response to determining that the funds have been transferred, causing at least one of the merchant device or the consumer device to generate an indication that the payment transaction is complete.

8. The system of claim 1, wherein the first visual code and the second visual code are displayable on an electronic ink display.

9. A method, comprising:
causing, by a payment provider server comprising one or more hardware processors, a merchant device of a merchant to display a first visual code, the first visual code encoding first payment initiation instructions for paying the merchant;
receiving a payment request to push a payment from a consumer to the merchant based on the first payment initiation instructions, the payment request being received by the payment provider server from a consumer device of the consumer after the first visual code has been decoded;
subsequent to the receiving the payment request, transferring the payment from a consumer account corresponding to the consumer to a merchant account corresponding to the merchant;
based on one or more code change criteria, causing the merchant device to display a second visual code in replacement of the first visual code, the second visual code having a different visual appearance than the first visual code, the second visual code encoding second payment initiation instructions for paying the merchant; and
subsequent to causing the merchant device to display the second visual code, causing the first visual code to become unusable for payments to the merchant.

10. The method of claim 9, wherein the first payment initiation instructions are a same as the second payment initiation instructions.

11. The method of claim 10, wherein the first payment initiation instructions include a Uniform Resource Locator (URL) address.

12. The method of claim 9, wherein the first payment initiation instructions are different than the second payment initiation instructions.

13. The method of claim 12, wherein the first payment initiation instructions include a Uniform Resource Locator (URL) address, and the second payment initiation instructions include a different URL address.

14. The method of claim 9, further comprising:
receiving a second payment request to push a payment from a second consumer to the merchant based on the second payment initiation instructions, the second payment request being received by the payment provider server from a second consumer device of the second consumer after the second visual code has been decoded; and
subsequent to the receiving the second payment request, transferring the payment from a second consumer account corresponding to the second consumer to the merchant account.

15. The method of claim 14, further comprising:
causing, based on the first payment initiation instructions included in the first visual code, the consumer device to display a first user interface corresponding to the payment request; and
causing, based on the second payment initiation instructions included in the second visual code, the second consumer device to display a second user interface corresponding to the second payment request.

16. The method of claim 15, wherein the first user interface is the same as a second user interface.

17. A non-transitory computer readable medium storing computer-executable instructions, that in response to execution by one or more hardware processors, causes a system to perform operations comprising:
causing, by a payment provider server comprising one or more hardware processors, a merchant device of a merchant to display a first visual code, the first visual code encoding first payment initiation instructions for paying the merchant;
receiving a payment request to push a payment from a consumer to the merchant based on the first payment initiation instructions, the payment request being received by payment provider server from a consumer device of the consumer after the first visual code has been decoded;
subsequent to the receiving the payment request, transferring the payment from a consumer account corresponding to the consumer to a merchant account corresponding to the merchant;
based on one or more code change criteria, causing the merchant device to display a second visual code in replacement of the first visual code, the second visual code having a different visual appearance than the first visual code, the second visual code encoding second payment initiation instructions for paying the merchant; and
subsequent to causing the merchant device to display the second visual code, causing the first visual code to become unusable for payments to the merchant.

18. The non-transitory computer readable medium of claim 17, wherein the operations further comprise:
determining a total price of one or more items being purchased by the consumer;
determining a payment amount included in the payment request; and
determining whether the payment amount is equal to the total price.

19. The non-transitory computer readable medium of claim 17, wherein the transferring the payment from the account of the consumer to the account of the merchant is performed in response to determining that the payment amount is equal to a total price.

20. The non-transitory computer readable medium of claim 17, wherein the operations further comprise:
in response to transferring the payment from the consumer account to the merchant account, causing at least one of the merchant device or the consumer device to generate an indication that the payment is complete.

* * * * *